US011338778B2

(12) United States Patent
Lin et al.

(10) Patent No.: US 11,338,778 B2
(45) Date of Patent: May 24, 2022

(54) BRAKING SYSTEM FOR AUTONOMOUS CAR AND SETTING METHOD THEREOF

(71) Applicant: Acer Incorporated, New Taipei (TW)

(72) Inventors: Jiunn-Jou Lin, New Taipei (TW); Yi-Wen Chen, New Taipei (TW)

(73) Assignee: ACER INCORPORATED, New Taipei (TW)

(*) Notice: Subject to any disclaimer, the term of this patent is extended or adjusted under 35 U.S.C. 154(b) by 506 days.

(21) Appl. No.: 16/432,001

(22) Filed: Jun. 5, 2019

(65) Prior Publication Data
US 2019/0389438 A1  Dec. 26, 2019

(30) Foreign Application Priority Data
Jun. 20, 2018  (TW) .................................. 107121121

(51) Int. Cl.
*B60T 7/04* (2006.01)
*B60T 17/08* (2006.01)
(Continued)

(52) U.S. Cl.
CPC ............ *B60T 7/042* (2013.01); *B60T 17/088* (2013.01); *B60W 10/18* (2013.01); *B60T 2260/09* (2013.01); *G05D 1/0088* (2013.01)

(58) Field of Classification Search
CPC .... B60T 7/042; B60T 17/088; B60T 2260/09; B60T 2220/04; B60T 11/18;
(Continued)

(56) References Cited

U.S. PATENT DOCUMENTS 2,871,827 A * 2/1959 Euga ....................... F16D 65/22
                                                         92/50
4,206,605 A * 6/1980 Mehren ................. B60T 13/143
                                                         60/545

(Continued)

FOREIGN PATENT DOCUMENTS

CN      101797917 A      8/2010
CN      106427950 A      2/2017
(Continued)

OTHER PUBLICATIONS

Chinese language office action dated Jul. 28, 2020, issued in application No. CN 201811094246.4.

*Primary Examiner* — Robert A. Siconolfi
*Assistant Examiner* — James K Hsiao
(74) *Attorney, Agent, or Firm* — McClure, Qualey & Rodack, LLP

(57) ABSTRACT

A braking system for an autonomous car is provided, including a car body, a pedal, a braking mechanism, a resistance ruler, a driving motor, a connecting member, a first micro switch, a second micro switch, and a control unit. The pedal is pivotally connected to the car body, the braking mechanism is connected to the pedal, and the resistance ruler is disposed on the pedal. The connecting member is connected to the driving motor and the pedal. The control unit is electrically connected to the driving motor, the resistance ruler, the first micro switch, and the second micro switch. When the pedal is in a first position relative to the car body, the pedal contacts and actuates the first micro switch. When the pedal rotates relative to the car body from the first position to a second position, the pedal contacts and actuates the second micro switch.

11 Claims, 5 Drawing Sheets

(51) Int. Cl.
*B60W 10/18* (2012.01)
*G05D 1/00* (2006.01)

(58) Field of Classification Search
CPC .............. B60W 10/18; G05D 1/0088; F16D 2500/3101; F16D 2500/31426; F16D 2500/31433
See application file for complete search history.

(56) References Cited

U.S. PATENT DOCUMENTS

| | | | | |
|---|---|---|---|---|
| 4,224,832 A * | 9/1980 | Prohaska | ............... | B60T 13/745 74/388 R |
| 4,483,682 A * | 11/1984 | Cavil | ................. | B63H 5/08 440/53 |
| 4,757,300 A * | 7/1988 | Sebalos | ................. | B60Q 1/441 116/204 |
| 5,195,606 A * | 3/1993 | Martyniuk | ............... | B60T 7/02 180/272 |
| 5,503,468 A * | 4/1996 | Saffran | ................. | B60T 7/20 188/3 H |
| 5,951,116 A * | 9/1999 | Nagasaka | ............... | B60T 8/885 303/14 |
| 6,050,649 A * | 4/2000 | Hensley | ................. | B60Q 1/441 188/158 |
| 6,247,762 B1 * | 6/2001 | Kusano | ................. | B60T 7/042 303/3 |
| 6,253,635 B1 * | 7/2001 | Huber | ................. | B60T 7/042 267/158 |
| 6,276,763 B1 * | 8/2001 | Isono | ................. | B60T 7/042 188/358 |
| 6,289,271 B1 * | 9/2001 | Isono | ................. | B60T 7/042 303/122.12 |
| 6,315,371 B1 * | 11/2001 | Wachi | ................. | B60T 7/042 303/11 |
| 6,324,457 B1 * | 11/2001 | Minowa | ................. | B60W 10/11 701/70 |
| 6,338,398 B1 * | 1/2002 | Eguchi | ................. | B60T 7/042 188/134 |
| 6,460,429 B1 * | 10/2002 | Staker | ................. | F02D 11/106 74/513 |
| 6,471,304 B1 * | 10/2002 | Demi | ................. | B60T 8/3215 303/113.4 |
| 6,571,662 B1 * | 6/2003 | Mendis | ................. | B60K 23/02 307/10.1 |
| 6,626,504 B2 * | 9/2003 | Harner | ................. | B60T 7/20 303/7 |
| 6,708,792 B2 * | 3/2004 | Hirata | ................. | G05G 1/32 180/274 |
| 6,763,741 B2 * | 7/2004 | Frobel | ................. | B60K 23/02 74/512 |
| 7,093,515 B2 * | 8/2006 | Yamanoi | ................. | B60R 22/48 180/269 |
| 7,395,667 B2 * | 7/2008 | Arnold | ................. | B60T 7/042 60/545 |
| 8,165,747 B2 * | 4/2012 | Ueno | ................. | B60T 7/042 701/36 |
| 8,770,060 B2 * | 7/2014 | Maruyama | ............ | B60K 26/021 74/513 |
| 8,950,564 B1 * | 2/2015 | Penner | ................. | B60T 1/062 192/221 |
| 9,475,386 B2 * | 10/2016 | Horiuchi | ................. | G05G 5/03 |
| 9,815,445 B2 * | 11/2017 | Cann | ................. | B60T 7/042 |
| 10,427,666 B1 * | 10/2019 | Van Haecke | ......... | B60T 17/221 |
| 10,919,443 B2 * | 2/2021 | Davies | ................. | B60Q 1/46 |
| 2002/0029914 A1 * | 3/2002 | Schmidt | ................. | B60W 10/04 180/175 |
| 2002/0074207 A1 * | 6/2002 | Kupper | ................. | B60W 10/18 192/220.1 |
| 2002/0078782 A1 * | 6/2002 | Flynn | ................. | G05G 1/405 74/512 |
| 2002/0161487 A1 * | 10/2002 | Kojima | ................. | G05G 1/30 701/1 |
| 2003/0188600 A1 * | 10/2003 | Slanec | ................. | G01D 5/2013 74/514 |
| 2004/0020323 A1 * | 2/2004 | Harth | ................. | B60T 7/06 74/512 |
| 2006/0224284 A1 * | 10/2006 | Ueno | ................. | G05G 5/03 701/36 |
| 2006/0231074 A1 * | 10/2006 | Ueno | ................. | B60T 7/042 123/399 |
| 2007/0034492 A1 * | 2/2007 | Johnson | ................. | H01H 3/48 200/61.54 |
| 2007/0296268 A1 * | 12/2007 | Shaw | ................. | B60T 7/042 303/20 |
| 2008/0053265 A1 * | 3/2008 | Bannon | ................. | B60R 21/09 74/512 |
| 2008/0189000 A1 * | 8/2008 | Duong | ................. | B60T 7/22 701/20 |
| 2008/0303340 A1 * | 12/2008 | Crombez | ............ | B60T 8/4086 303/15 |
| 2010/0126167 A1 * | 5/2010 | Nagel | ................. | B60T 13/745 60/545 |
| 2012/0073286 A1 * | 3/2012 | Takayama | ............ | B60T 13/745 60/538 |
| 2013/0325282 A1 * | 12/2013 | Terasaka | ................. | B60T 13/686 701/79 |
| 2014/0095044 A1 * | 4/2014 | Kikawa | ................. | B60T 7/042 701/70 |
| 2015/0070003 A1 * | 3/2015 | Elliott | ................. | B60T 8/368 324/207.15 |
| 2015/0274143 A1 * | 10/2015 | Miyazaki | ............ | B60T 7/042 303/9.61 |
| 2015/0314767 A1 * | 11/2015 | Miyazaki | ............ | B60T 13/142 303/10 |
| 2016/0129893 A1 * | 5/2016 | Ishino | ................. | B60T 8/17 701/70 |
| 2017/0327100 A1 * | 11/2017 | Wiesen | ................. | B60T 11/18 |
| 2018/0001875 A1 * | 1/2018 | Houtman | ................. | B60T 11/18 |
| 2018/0065609 A1 * | 3/2018 | Leiber | ................. | B60T 8/368 |
| 2018/0148025 A1 * | 5/2018 | Strehle | ................. | B60T 8/1755 |
| 2018/0208163 A1 * | 7/2018 | Lee | ................. | B60T 13/746 |
| 2018/0215368 A1 * | 8/2018 | Isono | ................. | B60T 8/3255 |
| 2018/0236983 A1 * | 8/2018 | Moury | ................. | B60W 50/10 |
| 2019/0016314 A1 * | 1/2019 | Sanders | ................. | B60T 13/662 |
| 2019/0351884 A1 * | 11/2019 | Tajima | ................. | B60T 17/22 |

FOREIGN PATENT DOCUMENTS

| | | |
|---|---|---|
| CN | 206493933 U | 9/2017 |
| CN | 206841419 U | 1/2018 |
| EP | 1 955 905 A1 | 8/2008 |
| EP | 3 137 351 A1 | 3/2017 |
| WO | 2015/165452 A1 | 11/2015 |

* cited by examiner

BRAKING SYSTEM FOR AUTONOMOUS CAR AND SETTING METHOD THEREOF

CROSS REFERENCE TO RELATED APPLICATIONS

The present application is based on, and claims priority from, Taiwan Patent Application No. 107121121, filed on Jun. 20, 2018, the disclosure of which is hereby incorporated by reference herein in its entirety.

BACKGROUND OF THE INVENTION

Field of the Invention

The application relates in general to a braking system, and in particular, to a braking system for an autonomous car.

Description of the Related Art

Thanks to technological advancements, unmanned vehicle technology has matured in recent years. In general, there are five types of unmanned vehicle: the unmanned ground vehicle (UGV), the unmanned aerial vehicle (UAV), unmanned surface vehicle (USV), the unmanned underwater vehicle (UUV), and the unmanned spacecraft.

An example of an unmanned ground vehicle is the autonomous car. When designing or using an autonomous car, the automatic control may fail or be inaccurate due to mechanical problems. Therefore, how to address the aforementioned problem has become an important issue.

BRIEF SUMMARY OF INVENTION

To address the deficiencies of conventional products, an embodiment of the invention provides a braking system for an autonomous car, including a car body, a pedal, a braking mechanism, a resistance ruler, a driving motor, a connecting member, a first micro switch, a second micro switch, and a control unit. The pedal is pivotally connected to the car body, the braking mechanism is connected to the pedal, and the resistance ruler is disposed on the pedal. The driving motor, the first micro switch, and the second micro switch are disposed on the car body, and the connecting member is connected to the driving motor and the pedal. The control unit is electrically connected to the driving motor, the resistance ruler, the first micro switch, and the second micro switch. When the pedal is in a first position relative to the car body, the pedal contacts and actuates the first micro switch. When the pedal rotates relative to the car body from the first position to a second position, the pedal contacts and actuates the second micro switch.

It should be noted that, when the connecting member is adjusted to its maximum length, the pedal is in the first position, and when the connecting member is adjusted to its minimum length, the pedal is in the second position. In an embodiment, the connecting member comprises a rope, and the driving motor comprises a winding portion, wherein the rope is wound on the winding portion. The rope can be a steel cable. In another embodiment, the connecting member comprises an extendable rod.

An embodiment of the invention further provides a setting method of a braking system for an autonomous car, including: providing the aforementioned braking system; transmitting a first signal to the control unit using the first micro switch when the pedal contacts the first micro switch; recording the resistance in the resistance ruler as the first resistance value when the control unit receives the first signal; transmitting a second signal to the control unit using the second micro switch when the pedal contacts the second micro switch; recording the resistance in the resistance ruler as the second resistance value when the control unit receives the second signal; and determining the position of the pedal according to the variation of the resistance in the resistance ruler in the range between the first resistance value and the second resistance value.

In an embodiment, the setting method further comprises dividing the range between the first resistance value and the second resistance value with a linear manner, so as to correspond to the position of the pedal.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the braking system for the autonomous car and the setting method thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
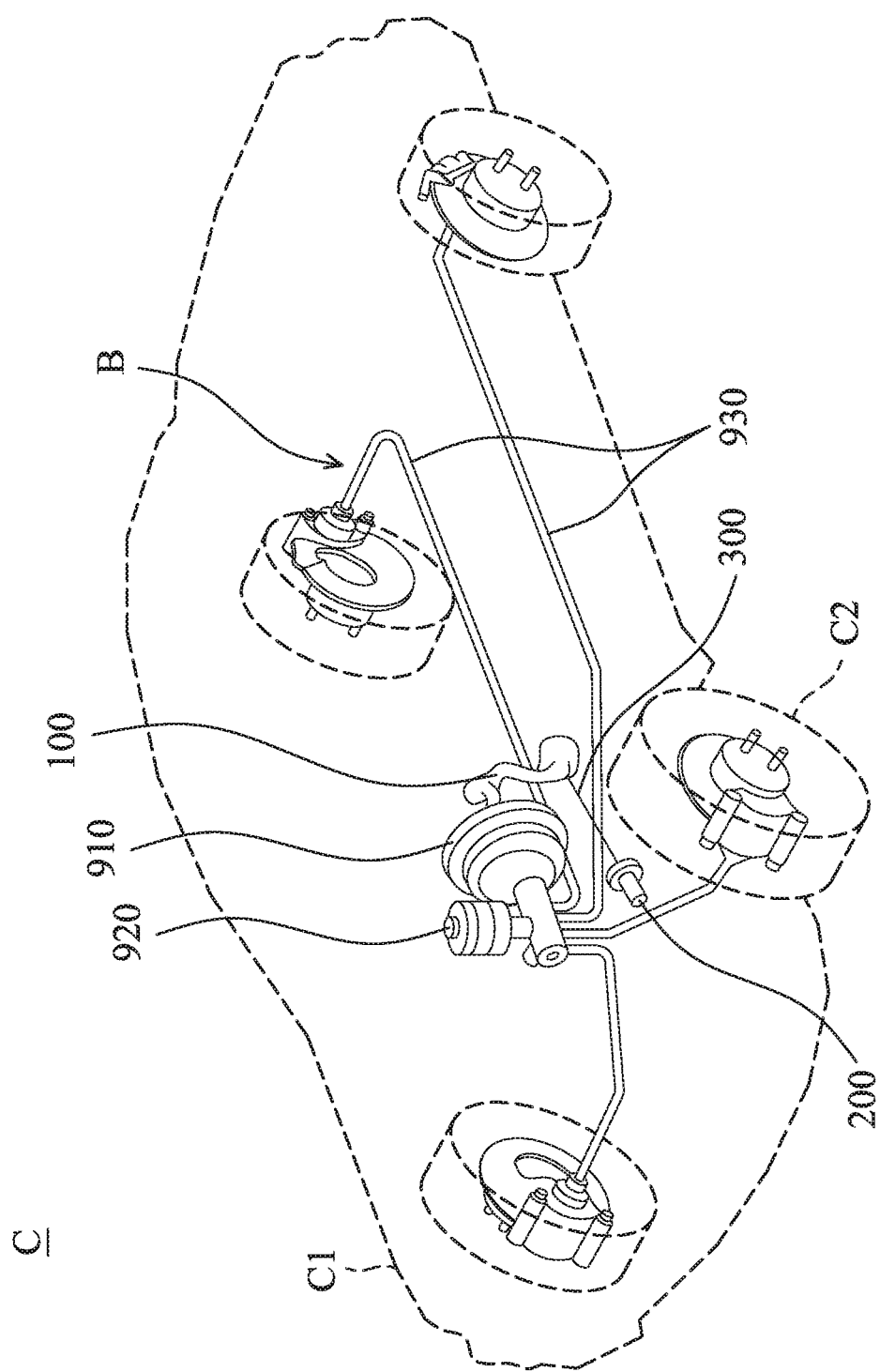
FIG. 1 is a schematic diagram of an autonomous car according to an embodiment of the invention.

Referring to FIG. 1, in an embodiment of the invention, a braking system B can be disposed in a car body C1 of an autonomous car C, so as to stop the moving autonomous car C or reduce the speed thereof. In particular, the braking system B can provide braking force to at least one wheel C2 of the autonomous car C to reduce the rotation speed of the wheel C2.

It should be noted that, although this embodiment uses a four-wheel vehicle (such as the autonomous car C in FIG. 1) as an example, the braking system B can be also used in a three-wheel vehicle (including the three-wheel vehicle having two front wheels or two rear wheels) and a two-wheel vehicle (such as a motorcycle or a bicycle).

Figure 2:
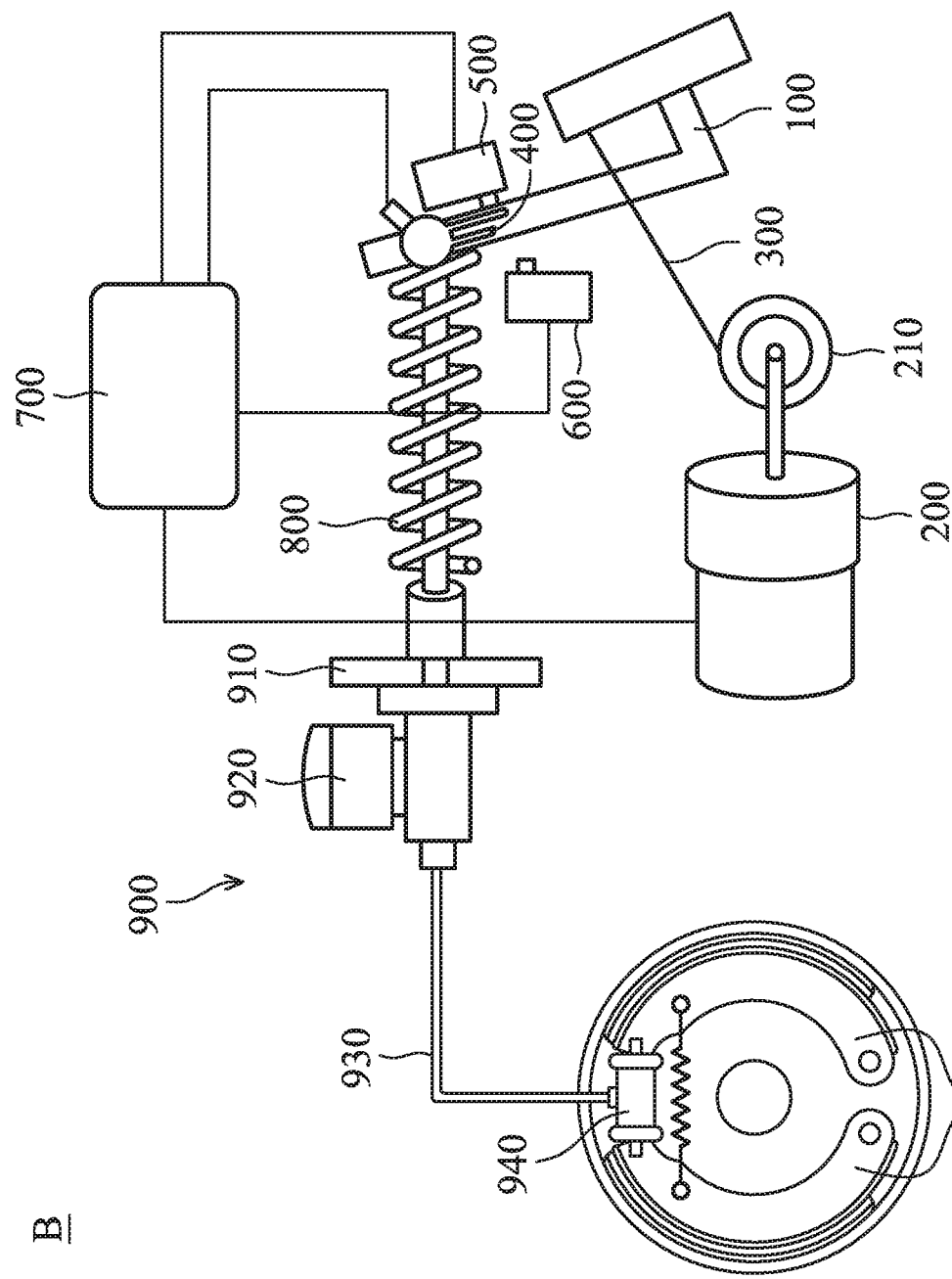
FIG. 2 is a schematic diagram of a braking system according to an embodiment of the invention, wherein a pedal is in a first position (an original position)

Referring to FIGS. 1 and 2, the braking system B primarily includes a pedal 100, a driving motor 200, a connecting member 300, a resistance ruler 400, a first micro switch 500, a second micro switch 600, a control unit 700, an elastic member 800, and a braking mechanism 900.

The pedal 100 is pivotally connected to the car body C1 of the autonomous car C, and the connecting member 300 connects the driving motor 200 to the pedal 100. Therefore, the driving motor 200 can apply a driving force to the pedal 100 via the connecting member 300, and the pedal 100 can rotate relative to the car body C1. In this embodiment, the driving motor 200 includes a winding portion 210, and the connecting member 300 is a rope. The rope is wound on the winding portion 210, and the opposite ends of the rope are respectively affixed to the pedal 100 and the winding portion 210. For ensuring the rigidity of the rope is enough to avoid breakage during stretching, the rope can be a steel cable in this embodiment.

The resistance ruler 400 is disposed on the pedal 100. When the pedal 100 rotates relative to the car body C1, the resistance ruler 400 can detect the moving range and/or the rotation angle of the pedal 100 according to the variation of the resistance in the resistance ruler 400. The first micro switch 500 and the second micro switch 600 are affixed to the car body C1, and electrically connected to the control unit 700. Furthermore, the control unit 700 is also electrically connected to the driving motor 200 and the resistance ruler 400.

The elastic member 800 can be a spring, which is connected to the car body C1 and the pedal 100, so as to provide an elastic force to the pedal 100. The pedal 100 can be therefore positioned in a predetermined position. The braking mechanism 900 is connected to the pedal 100 and the wheel C2 of the autonomous car C. When the pedal 100 rotates relative to the car body C1, the braking mechanism 900 can provide the braking force to the wheel C2. In this embodiment, the braking mechanism 900 includes a vacuum booster 910, a brake master cylinder 920, at least one brake fluid pipe 930, at least one wheel cylinder 940, and at least one brake pad 950.

The vacuum booster 910 is connected to the pedal 100. The brake master cylinder 920 is connected to the vacuum booster 910. The wheel cylinder 940 is connected to the brake master cylinder 920 via the brake fluid pipe 930. The brake pad 950 is disposed in the wheel C2 and connected to the wheel cylinder 940.

When the user steps the pedal 100 to rotate the pedal 100, or the winding portion 210 of the driving motor 200 rotates and the connecting member 300 is wound to pull and rotate the pedal 100, the vacuum booster 910 can be driven by the pedal 100 and provides a push force to the brake master cylinder 920. The liquid in the brake master cylinder 920 (such as the braking oil) can be pushed and flow to the wheel cylinder 940 via the brake fluid pipe 930. Subsequently, the brake pad 950 can be pushed and move to brake.

The driving motor 200 can be controlled by the control unit 700, so as to achieve the purpose of automatic driving. The setting method of the braking system B of the autonomous car C is discussed below.

First, as shown in FIG. 2, when there is no external force applied on the pedal 100, the pedal 100 is in an original position (a first position) due to the elastic force of the elastic member 800. The pedal 100 contacts the first micro switch 500 to actuate it, and the first micro switch 500 transmits a first signal to the control unit 700. When the control unit 700 receives the first signal, it can record the resistance in the resistance ruler 400 as the first resistance value.

Figure 3:
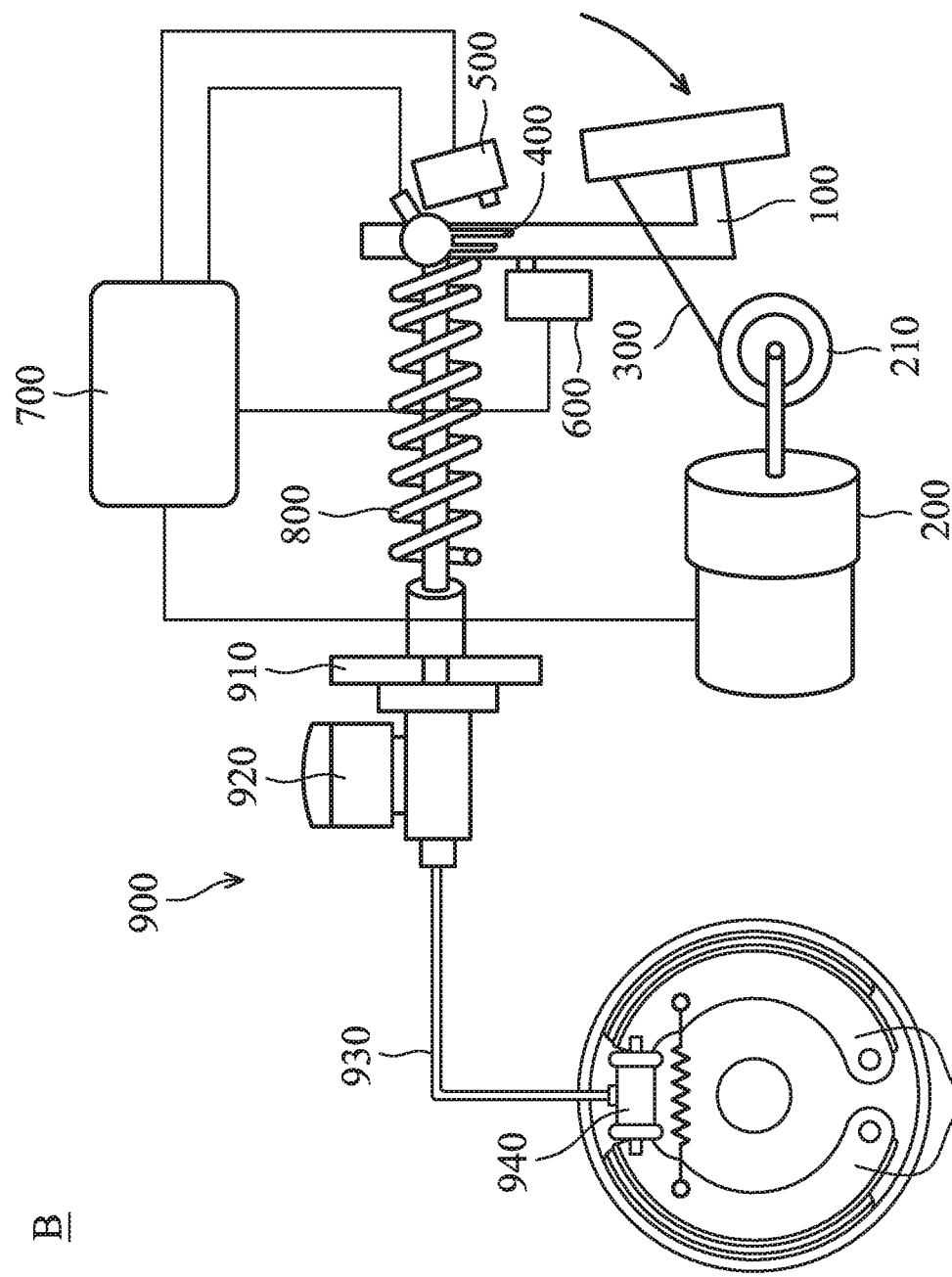
FIG. 3 is a schematic diagram of the braking system according to an embodiment of the invention, wherein the pedal is in a second position.

Second, as shown in FIG. 3, the pedal 100 can rotate relative to the car body C1 from the first position to a second position by stepping the pedal 100 or pulling the pedal 100 via the driving motor 200 and the connecting member 300. At this time, the pedal 100 contacts the second micro switch 600 to actuate it, and the second micro switch 600 transmits a second signal to the control unit 700. When the control unit 700 receives the second signal, it can record the resistance in the resistance ruler 400 as the second resistance value.

Next, the control unit 700 can divide the range between the first resistance value and the second resistance value with a linear manner, so as to correspond to the position of the pedal 100. In other words, the control unit 700 can obtain the position of the pedal 100 by reading the resistance in the resistance ruler 400. For example, if the first resistance value is R1 and the second resistance value is R2, when the control unit 700 reads the resistance in the resistance ruler 400 is (R1+R2)/2, the pedal 100 can be determined as being in a middle position between the first position and the second position, wherein the distance between the first position and the middle position is substantially the same as the distance between the second position and the middle position.

It should be noted that, in this embodiment, when the pedal 100 is in the first position, the connecting member 300 is adjusted to its maximum length. That is, the connecting member 300 (the rope) is tight and cannot extend any further. When the pedal 100 is in the second position, the connecting member 300 is adjusted to its minimum length. Therefore, situations in which the brake is not actuated or the motor is idling due to the slack rope can be avoided.

After the aforementioned setting, the control unit 700 can obtain the definite position of the pedal 100. In automatic driving, the control unit 700 can control the driving motor 200 to adjust the length of the connecting member 300, and precisely control the position of the pedal 100.

Figure 4:
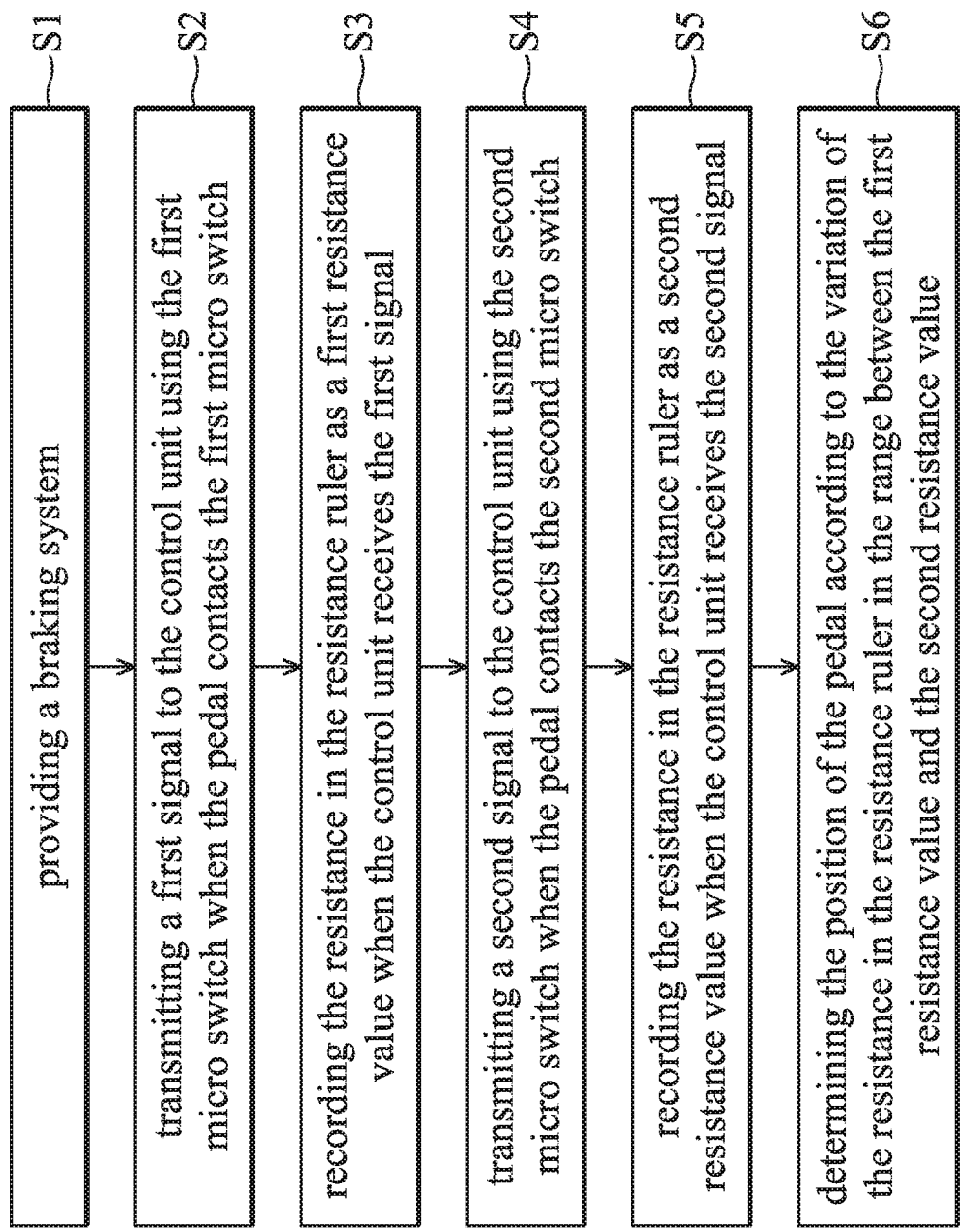
FIG. 4 is a flow chart of a setting method for the braking system according to an embodiment of the invention.

FIG. 4 is a flow chart of the setting method for the braking system according to an embodiment of the invention. As shown in FIG. 4, a braking system can be provided (step S1), including a pedal, a driving motor, a connecting member, a resistance ruler, a first micro switch, a second micro switch, a control unit, an elastic member, and a braking mechanism. The specific structure of the braking system is shown in FIG. 1.

Subsequently, when the pedal contacts the first micro switch, the first micro switch transmits a first signal to the control unit (step S2), and when the control unit receive the first signal, the resistance in the resistance ruler can be recorded as the first resistance value (step S3).

Similarly, when the pedal contacts the second micro switch, the second micro switch transmits a second signal to the control unit (step S4), and when the control unit receive the second signal, the resistance in the resistance ruler can be recorded as the second resistance value (step S5).

Finally, the position of the pedal can be obtained according to the variation of the resistance in the resistance ruler in the range between the first resistance value and the second resistance value (step S6). Specifically, the range between the first resistance value and the second resistance value can be divided with a linear manner and corresponded to the position of the pedal.

Figure 5:
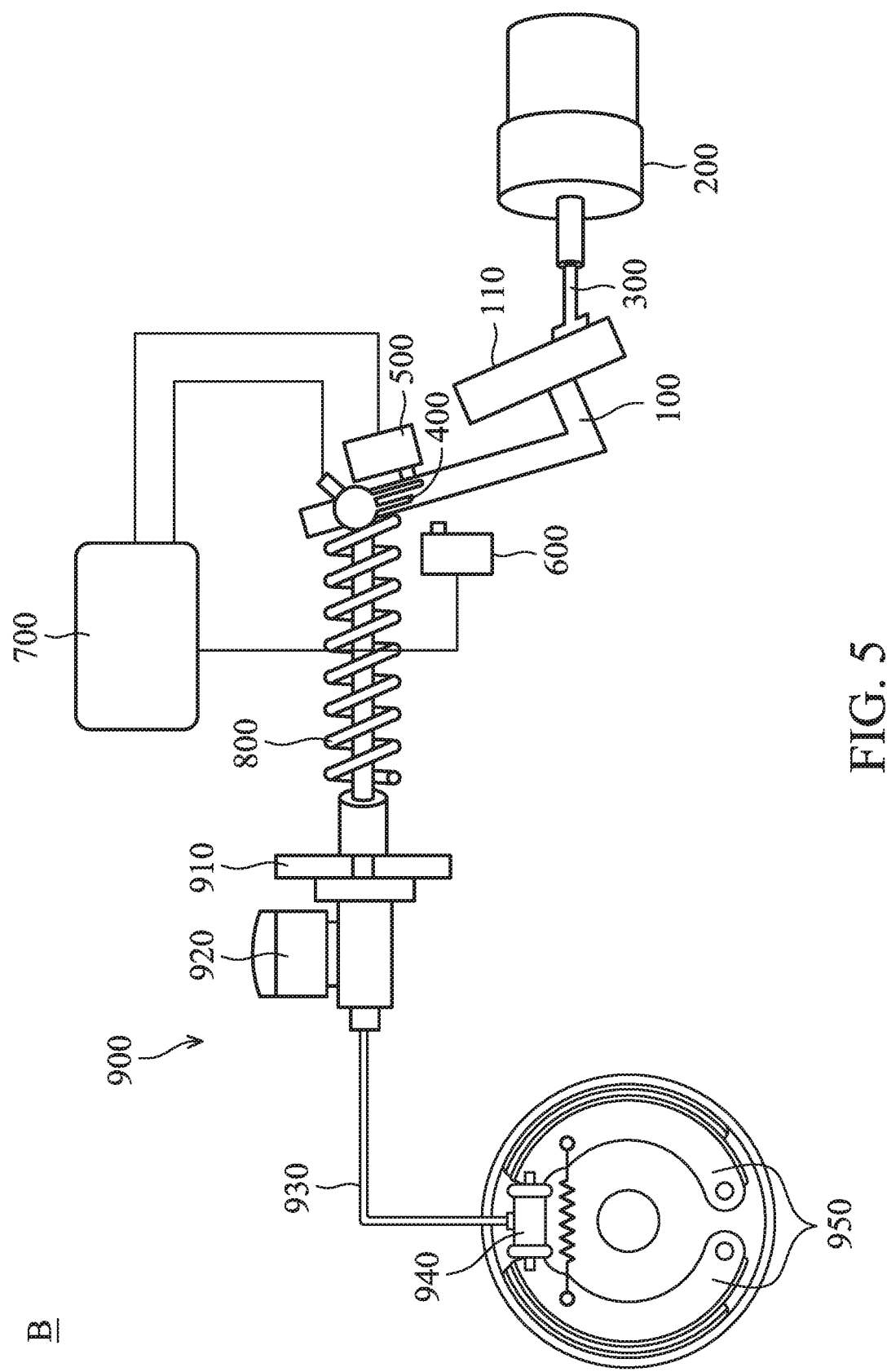
FIG. 5 is a schematic diagram of a braking system according to another embodiment of the invention.

Referring to FIG. 5, in another embodiment, the connecting member 300 is an extendable rod abutting a step surface 110 of the pedal 100. When the driving motor 200 drives the extendable rod to elongate, the extendable rod can push the pedal 100 to rotate relative to the car body C1.

Furthermore, the pedal 100 can be pivotally connected to the car body C1 with any suitable manner. For example, the pedal 100 can be a vertical brake pedal or a hanging brake pedal.

In summary, a braking system for an autonomous car is provided, including a car body, a pedal, a braking mechanism, a resistance ruler, a driving motor, a connecting member, a first micro switch, a second micro switch, and a control unit. The pedal is pivotally connected to the car body, the braking mechanism is connected to the pedal, and the resistance ruler is disposed on the pedal. The driving motor, the first micro switch, and the second micro switch are disposed on the car body, and the connecting member is connected to the driving motor and the pedal. The control unit is electrically connected to the driving motor, the resistance ruler, the first micro switch, and the second micro switch. When the pedal is in a first position relative to the car body, the pedal contacts and actuates the first micro switch. When the pedal rotates relative to the car body from the first position to a second position, the pedal contacts and actuates the second micro switch.

An embodiment of the invention further provides a setting method of a braking system for an autonomous car, including: providing the aforementioned braking system; transmitting a first signal to the control unit using the first micro switch when the pedal contacts the first micro switch; recording the resistance in the resistance ruler as the first resistance value when the control unit receives the first signal; transmitting a second signal to the control unit using the second micro switch when the pedal contacts the second micro switch; recording the resistance in the resistance ruler as the second resistance value when the control unit receives the second signal; and determining the position of the pedal according to the variation of the resistance in the resistance ruler in the range between the first resistance value and the second resistance value.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A braking system for an autonomous car, comprising:
   a car body;
   a pedal, pivotally connected to the car body;
   a braking mechanism, connected to the pedal;
   a resistance ruler, disposed on the pedal;
   a driving motor, disposed in the car body;
   a connecting member, connecting to the driving motor to the pedal;
   a first micro switch, disposed on the car body;
   a second micro switch, disposed on the car body; and
   a control unit, electrically connected to the driving motor, the resistance ruler, the first micro switch, and the second micro switch, wherein when the pedal is in a first position relative to the car body, the pedal contacts and actuates the first micro switch, and the pedal is separated from the second micro switch, wherein when the pedal rotates relative to the car body from the first position to a second position, the pedal contacts and actuates the second micro switch, and the pedal is separated from the first micro switch.

2. The braking system as claimed in claim 1, wherein the connecting member comprises a rope.

3. The braking system as claimed in claim 2, wherein the rope is a steel cable.

4. The braking system as claimed in claim 2, wherein the driving motor comprises a winding portion, and the rope is wound on the winding portion.

5. The braking system as claimed in claim 1, wherein the connecting member comprises an extendable rod.

6. The braking system as claimed in claim 5, wherein when the connecting member is extended to a maximum length, the pedal is in the first position, and when the connecting member is pulled back to a minimum length, the pedal is in the second position.

7. The braking system as claimed in claim 1, wherein the braking mechanism comprises:
   a brake master cylinder, connected to the pedal;
   a brake pad;
   a wheel cylinder, connected to the brake pad; and
   a brake fluid pipe, connected to the brake master cylinder and the wheel cylinder.

8. The braking system as claimed in claim 7, wherein the braking mechanism further comprises a vacuum booster, disposed between the brake master cylinder and the pedal.

9. The braking system as claimed in claim 1, wherein the braking mechanism further comprises an elastic member, connected to the car body and the pedal.

10. A setting method of a braking system for an autonomous car, comprising:
    providing a braking system, wherein the braking system comprises:
    a car body;
    a pedal, pivotally connected to the car body;
    a braking mechanism, connected to the pedal;
    a resistance ruler, disposed on the pedal;
    a driving motor, disposed in the car body;
    a connecting member, connected to the driving motor and the pedal;
    a first micro switch, disposed on the car body, wherein when the pedal is in a first position relative to the car body, the pedal contacts and actuates the first micro switch;
    a second micro switch, disposed on the car body, wherein when the pedal rotates relative to the car body from the first position to a second position, the pedal contacts and actuates the second micro switch; and a control unit, electrically connected to the driving motor, the resistance ruler, the first micro switch, and the second micro switch;

transmitting a first signal to the control unit using the first micro switch when the pedal contacts the first micro switch;

recording the resistance in the resistance ruler as a first resistance value when the control unit receives the first signal;

transmitting a second signal to the control unit using the second micro switch when the pedal contacts the second micro switch;

recording the resistance in the resistance ruler as a second resistance value when the control unit receives the second signal; and determining the position of the pedal according to the variation of the resistance in the resistance ruler in the range between the first resistance value and the second resistance value.

11. The setting method as claimed in claim 10, wherein the setting method further comprises dividing the range between the first resistance value and the second resistance value in a linear manner, so as to correspond to the position of the pedal.

* * * * *